United States Patent
Wang

(10) Patent No.: US 12,321,580 B2
(45) Date of Patent: Jun. 3, 2025

(54) WALLPAPER DISPLAY CONTROL METHOD AND APPARATUS AND ELECTRONIC DEVICE

(71) Applicant: VIVO MOBILE COMMUNICATION CO., LTD., Dongguan (CN)

(72) Inventor: Yifang Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 196 days.

(21) Appl. No.: 18/154,568

(22) Filed: Jan. 13, 2023

(65) Prior Publication Data

US 2023/0152956 A1 May 18, 2023

Related U.S. Application Data

(63) Continuation of application No. PCT/CN2021/106742, filed on Jul. 16, 2021.

(30) Foreign Application Priority Data

Jul. 17, 2020 (CN) .......................... 202010692232.3

(51) Int. Cl.
  *G06F 3/04845* (2022.01)
  *G06F 3/04847* (2022.01)
  (Continued)

(52) U.S. Cl.
  CPC ...... *G06F 3/04845* (2013.01); *G06F 3/04847* (2013.01); *G06F 9/451* (2018.02); *G06T 13/80* (2013.01)

(58) Field of Classification Search
  None
  See application file for complete search history.

(56) References Cited

U.S. PATENT DOCUMENTS

2011/0119610 A1* 5/2011 Hackborn ............. G06F 3/0488
  715/764
2014/0089858 A1  3/2014 Yu et al.
  (Continued)

FOREIGN PATENT DOCUMENTS

CN   104375797 A   2/2015
CN   104484096 A   4/2015
  (Continued)

OTHER PUBLICATIONS

China National Intellectual Property Administration, International Search Report issued in corresponding Application No. PCT/CN2021/106742, mailed Oct. 14, 2021.
  (Continued)

*Primary Examiner* — Nurun Flora
(74) *Attorney, Agent, or Firm* — Stites & Harbison, PLLC; Jeffrey A. Haeberlin

(57) ABSTRACT

The present application discloses a wallpaper display control method and apparatus and an electronic device, which belong to the technical field of electronic devices. The method includes: receiving a first input performed by a user, where the first input is used to trigger lighting of a screen of an electronic device; and in response to the first input, control an object layer image of a wallpaper image of the screen of the electronic device to execute a first display animation based on a first animation parameter, and control a background layer image of the wallpaper image to execute a second display animation based on a second animation parameter, where the first animation parameter and the second animation parameter are different.

17 Claims, 3 Drawing Sheets

(51) Int. Cl.
    *G06F 9/451*     (2018.01)
    *G06T 13/80*     (2011.01)

(56) References Cited

U.S. PATENT DOCUMENTS

| | | | |
|---|---|---|---|
| 2016/0203307 A1 | 7/2016 | Kyowski et al. | |
| 2018/0210612 A1* | 7/2018 | Lyubich | G06F 3/0481 |
| 2018/0373342 A1* | 12/2018 | Bai | H04M 1/72427 |

FOREIGN PATENT DOCUMENTS

| | | |
|---|---|---|
| CN | 105630445 A | 6/2016 |
| CN | 107704302 A | 2/2018 |
| CN | 109117239 A | 1/2019 |
| CN | 109582427 A | 4/2019 |
| CN | 111857511 A | 10/2020 |
| KR | 10-2013-0048526 A | 5/2013 |

OTHER PUBLICATIONS

European Patent Office, Supplementary European Search Report issued in corresponding Application No. EP 21842265 mailed Jan. 3, 2024.
Anonymous. "Voronoi diagram—Wikipedia," Jul. 16, 2020, pp. 1-14, XP093108059.
Anonymous. "WIDGG's Research: Live Wallpaper," Jun. 14, 2011, pp. 1-4, XP093108045.
Anonymous. "WIDGG's Research: Drivers Update-Live Wallpaper (some progress)," Jun. 16, 2011, pp. 1-2, XP093108053.

* cited by examiner

WALLPAPER DISPLAY CONTROL METHOD AND APPARATUS AND ELECTRONIC DEVICE

CROSS-REFERENCE TO RELATED APPLICATIONS

The present application is a continuation of International Application No. PCT/CN2021/106742, filed on Jul. 16, 2021, which claims priority to Chinese Patent Application No. 202010692232.3 filed in China in Jul. 17, 2020, which are incorporated herein by reference in their entireties.

TECHNICAL FIELD

The present application belongs to the technical field of electronic devices, and in particular, relates to a wallpaper display control method and apparatus and an electronic device.

BACKGROUND

Currently, mobile terminal users all like to set personalized wallpaper images on mobile terminal devices. The wallpaper image is displayed when the device screen is lit.

In the process of realizing the present application, the inventor found that there are at least the following problems in the prior art: the existing wallpaper images are generally fixed wallpaper images provided by manufacturers, and after the electronic devices display the wallpaper images, the user generally ignores the wallpaper images directly, and the function of the wallpaper images in the process of using the mobile terminal by the user is greatly reduced.

SUMMARY

According to a first aspect of the present application, a wallpaper display control method is provided, which includes:
  receiving a first input performed by a user, where the first input is used to trigger lighting of the screen of an electronic device; and
  in response to the first input, controlling an object layer image of a wallpaper image of the screen of the electronic device to execute a first display animation based on a first animation parameter, and controlling a background layer image of the wallpaper image to execute a second display animation based on a second animation parameter;
  where the first animation parameter and the second animation parameter are different.

According to a second aspect of the present application, a wallpaper display control apparatus is provided, which includes:
  a first receiving module, configured to receive a first input performed by a user, where the first input is used to trigger lighting of the screen of an electronic device; and
  a first response module, configured to: in response to the first input, control an object layer image of a wallpaper image of the screen of the electronic device to execute a first display animation based on a first animation parameter, and control a background layer image of the wallpaper image to execute a second display animation based on a second animation parameter;
  where the first animation parameter and the second animation parameter are different.

According to a third aspect of the present application, an electronic device is provided, where the electronic device includes a processor, a memory, and a program or an instruction stored in the memory and capable of running on the processor, and when the program or the instruction is executed by the processor, the steps of the method according to the first aspect are implemented.

According to a fourth aspect of the present application, a readable storage medium is provided, where the readable storage medium stores a program or an instruction, and when the program is executed by a processor, the steps of the access method according to the first aspect are implemented.

According to a fifth aspect of the present application, a chip is provided, where the chip includes a processor and a communications interface, the communications interface is coupled to the processor, and the processor is configured to run a program or an instruction, to implement the method according to the first aspect.

DESCRIPTION OF EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

The terms "first", "second", and the like in the specification and claims of the present application are used to distinguish between similar objects instead of describing a specific order or sequence. It should be understood that the data used in such a way is interchangeable in proper circumstances so that the embodiments of the present application can be implemented in an order other than the order illustrated or described herein. In addition, objects distinguished by "first", "second", and the like usually belong to one type, and the number of the objects is not limited. For example, there may be one or more first objects. In addition, in the specification and the claims, "and/or" represents at least one of connected objects, and a character "/" generally represents an "or" relationship between associated objects.

The image display method provided in the embodiments of the present application are described in detail below through specific embodiments and application scenarios thereof with reference to the accompanying drawings.

Figure 1:
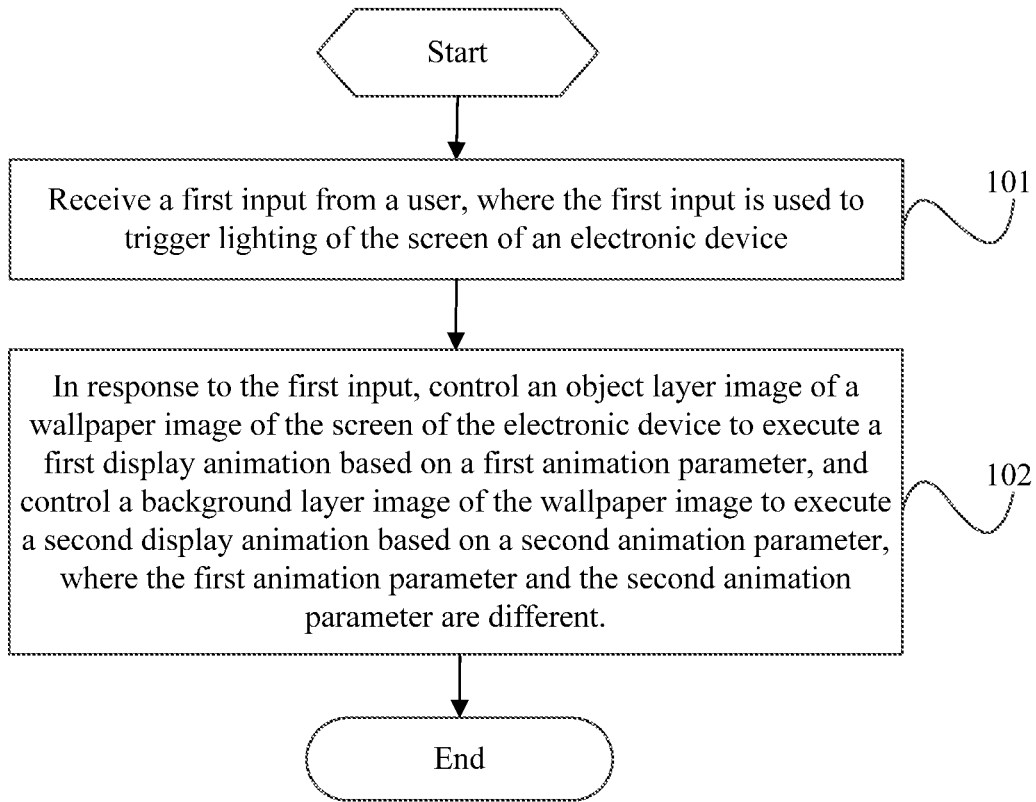
FIG. 1 is a schematic flowchart of a wallpaper display control method according to an embodiment of the present application.

As shown in FIG. 1, an embodiment of the present application provides an image display method, applied to an electronic device and including:

Step 101: Receive a first input performed by a user, where the first input is used to trigger lighting of the screen of an electronic device.

The first input is an input performed when the electronic device is in a screen-off state. Alternatively, the user can perform the first input in an unlocking scenario of the electronic device, or perform the first input in the scenario where screen-locking information of the electronic device is to be viewed. The first input may be a tap input, a double-tap input, or the like.

Step 102: In response to the first input, control an object layer image of a wallpaper image of the screen of the electronic device to execute a first display animation based on a first animation parameter, and control a background layer image of the wallpaper image to execute a second display animation based on a second animation parameter.

The first animation parameter and the second animation parameter are different.

In this step, after receiving the first input, the object layer image and the background layer image are dynamically displayed on the screen according to different animation parameters. For example, the object layer image is displayed in a manner of diffuse lighting, and the background layer image is displayed in a manner of slowly lighting. The first display animation refers to an animation when the object layer image is displayed according to the first animation parameter, and the second display animation refers to an animation when the background layer image is displayed according to the second animation parameter.

In this way, the object layer image and the background layer image are displayed based on different animation parameters, which can effectively distinguish the object layer image from the background layer image in the wallpaper image, and then can highlight the object layer image in the wallpaper image. In addition, any image set as the wallpaper by the user can achieve the effect of highlighting the object layer image in the wallpaper image, thereby strengthening the function of the wallpaper in the process of using the mobile terminal by the user.

Optionally, before the controlling an object layer image of a wallpaper image of the screen of the electronic device to execute a first display animation based on a first animation parameter, and controlling a background layer image of the wallpaper image to execute a second display animation based on a second animation parameter; the method further includes:

separating an object layer from a background layer of the wallpaper image to obtain the object layer image and the background layer image, and in a process of separating the object layer from the background layer of the wallpaper image, recording outline information and center point information of the object layer image.

The object layer may refer to a screen subject in the wallpaper image, and the screen subject may be a person or an object, a single person (object), or multiple persons (objects). The background layer may refer to an image other than the object layer in the wallpaper image. If there are multiple persons or objects, the wallpaper image includes multiple object layer images. Optionally, each person or object may correspond to one object layer image, or two or more persons or objects may correspond to one object layer image. For example, if the screen subject includes person A and person B, the object layer image includes two object layer images formed by person A and person B respectively.

Figure 2:
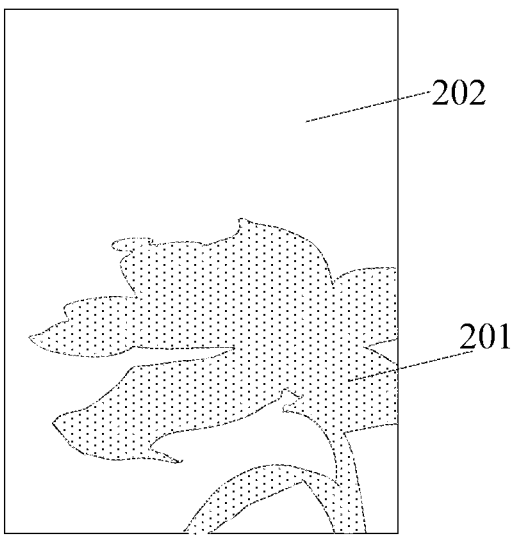
FIG. 2 is a schematic diagram of an object layer image and a background layer image of a wallpaper image according to an embodiment of the present application.

In this step, the object layer and the background layer of the wallpaper image can be separated through an image recognition technology. Optionally, after separation, each person or object can correspond to one object layer image, or two or more persons or objects can correspond to one object layer image. As shown in FIG. 2, an object layer image 201 and a background layer image 202 are obtained, and in the process of separating the object layer from the background layer of the wallpaper image, outline information and center point information of the object layer image are recorded.

Herein, by separating the object layer from the background layer of the wallpaper image, it is convenient to subsequently display the object layer image and the background layer image based on different animation parameters, so as to achieve the purpose of highlighting the object layer image, thereby strengthening the function of the wallpaper in the process of using the mobile terminal by the user.

Optionally, the controlling an object layer image of a wallpaper image of the screen of the electronic device to execute a first display animation based on a first animation parameter includes:

according to the outline information and the center point information of the object layer image, controlling the object layer image of the wallpaper image of the screen of the electronic device to execute the first display animation in a preset manner;

where the preset manner includes at least one of the following:

a manner of spreading from the center point to the surrounding, and a manner of gathering from the surrounding to the center point.

Of course, the preset manner may also include other animation display manners in the prior art, which are not specifically limited herein.

Figure 3A:
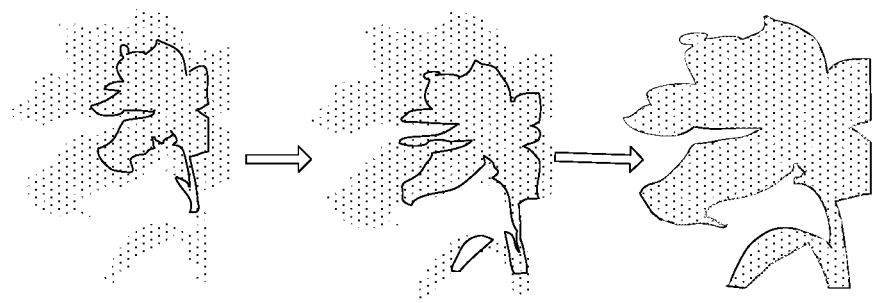
FIG. 3*a* is a first schematic diagram of display of an object layer image according to an embodiment of the present application.
Figure 3B:
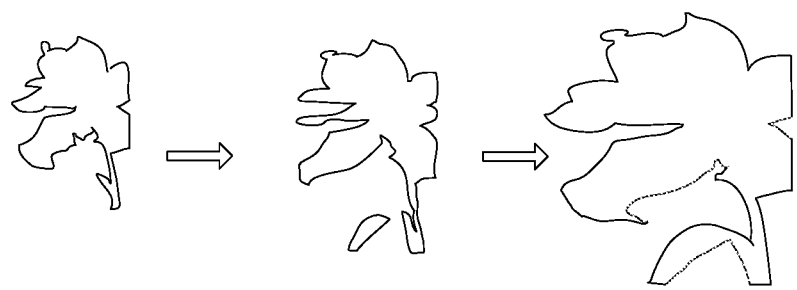
FIG. 3*b* is a second schematic diagram of display of an object layer image according to an embodiment of the present application.

According to the above description, in the embodiments of the present application, in the process of separating the object layer image from the background layer image, the outline information and the center point information of the object layer image are recorded. In a specific implementation, as shown in FIG. 3*a*, a mask is generated based on an outline according to the outline information of the object layer image, and a display area of the object layer image is controlled by the mask, so that the display area of the object layer image is gradually enlarged during the animation process, so as to achieve the visual effect that the object layer image diffuses and brightens in combination with its own shape. Alternatively, as shown in FIG. 3*b*, the display area of the object layer image is directly controlled to gradually spread during the animation process.

Here, according to the outline information and the center point information of the object layer image, the object layer image of the wallpaper image of the screen of the electronic device is controlled to execute the first display animation in a preset manner, which can realize that the object layer image executes the visual effect of the first display animation in combination with its own shape.

Optionally, the first animation parameter changes from a first numerical value to a second numerical value within a first animation duration, and the second animation parameter changes from a third numerical value to a fourth numerical value within a second animation duration;

The first animation duration is less than the second animation duration, and the first numerical value is greater than or equal to the third numerical value.

The first animation parameter includes at least one of transparency and brightness.

The second animation parameter includes at least one of transparency and brightness.

The first animation duration is an animation duration corresponding to the object layer image, and the second animation duration is an animation duration corresponding to the background layer image.

It should be noted that, in this embodiment of the present application, the first animation duration is a duration corresponding to a first time period, a time range of the first time period is from a first time to a second time, and the second animation duration is a duration corresponding to a second time period, a time range of the second time period is from a third time to a fourth time, where the first time and the third time may be the same or different, that is, the start time of the first animation duration and the start time of the second animation duration can be the same or different.

In addition, when the object layer image includes multiple objects, the multiple objects may be displayed simultaneously in an animated manner within the first animation duration according to the first animation parameter, or may be sequentially displayed in an animated manner within the first animation duration according to the first animation parameter.

For the object layer image, the first animation duration is T1, the variable value of transparency is A1, and the variable value of brightness is L1. For the background layer image, the second animation duration is T2, the variable value of transparency is A2, and the variable value of brightness is L2. T2 should be greater than T1, and the numerical changes of A1, L1, A2, and L2 should be controlled by different animation interpolators. It is assumed that the transparency of the object layer image changes from 50% (the first numerical value above) to 100% (the second numerical value above), the brightness changes from 20% (the first numerical value above) to 100% (the second numerical value above), and the animation duration is 500 ms (the first animation duration), the transparency of the background layer image changes from 0% (the third numerical value above) to 100% (the fourth numerical value above), and the brightness changes from 0% (the third numerical value above) to 100% (the fourth numerical value above), and the animation duration is 800 ms (the second animation duration). Assuming that the start times corresponding to the first animation duration and the second animation duration are the same (both are 0 ms), at 100 ms, the brightness of the object layer image is 50%, the transparency of the object layer image is 50%, the brightness of the background layer is 20%, and the transparency of the background layer is 20%; at 300 ms, the brightness of the object layer image is 70%, the transparency of the object layer image is 70%, the brightness of the background layer is 40%, and the transparency of the background layer is 40%; at 500 ms, the brightness of the object layer image is 100%, the transparency of the object layer image is 100%, the brightness of the background layer is 70%, and the transparency of the background layer is 70%.

In this way, through the first animation parameter and the second animation parameter, the object layer image in the wallpaper image diffuses and brightens, and the background layer image slowly brightens, thereby achieving the effect of highlighting the object layer image.

It should be noted that, in this embodiment of the present application, in addition to displaying different display effects to the user through brightness and transparency, the object layer image can also be highlighted through animation scaling of different amplitudes, or the object layer image can be highlighted through displacement animation of different amplitudes.

Optionally, the wallpaper display control method of the embodiments of the present application further includes:
  receiving a second input performed by the user on the screen;
  determining an input parameter of the second input, where the input parameter includes at least one of an input time and an input location; and
  executing a target control function according to target information;
  where the target information includes at least one of the following: a first relationship, a second relationship, and a real-time display area of the wallpaper image;
  where the first relationship refers to a relationship between the input time and the first animation duration and the second animation duration, the second relationship refers to a relationship between the input position and a first display area and a second display area, the first display area is a display area corresponding to the object layer image, and the second display area is a display area corresponding to the background layer image;

The real-time display area of the wallpaper image is a real-time display area of the background layer image or a real-time display area of the object layer image.

The second input may be a tap input, a double-tap input, or the like.

Herein, different target control functions are triggered according to at least one of the input time of the second input, the input position of the second input, and the real-time display area of the wallpaper image, thereby realizing the interaction between the user and the wallpaper image. Besides, the interaction between the user and the wallpaper image triggers different target control functions, which can effectively protect the privacy and security of a machine owner mode.

Optionally, the performing the target control function according to the target information includes:
  when the input time is within a time range corresponding to the first animation duration, and the input position is within the first display area, displaying an unlock interface;
  or when the input time is within the time range corresponding to the first animation duration, the input position is within the first display area, and the input track of the second input is a preset track, displaying the target information of a preset application program.

Assuming that the first animation duration is the duration corresponding to the first time period, the first time period is from 0 ms to 10 ms, and the second input is input at the second ms, the input time of the second input is within a time period corresponding to the first animation duration. If the input position is still in the first display area, the unlock interface is displayed, the unlock interface includes a password input keyboard, and the user can enter the machine owner mode only after entering a correct password. On the contrary, unlock to enter through other methods is in a guest mode. Therefore, even if the password is leaked and there is no correct interaction with the display effect of the wallpaper image, it is difficult to enter the machine owner mode, thereby effectively protecting the privacy and security of the machine owner mode.

Exemplarily, the second input is a slide-down input and slides down in the first display area within the first display duration, and the input track of the second input is a preset track. In this case, the weather information of the weather application program is displayed, so that the user can easily check local weather.

Herein, a specific function is triggered by a specific gesture, so that the user can interact with the display effect of the wallpaper image, and the wallpaper image is further empowered on the basis of appreciation. In addition, different target control functions are triggered by interaction between the user and the wallpaper image, and the target control functions can effectively protect the privacy and security of the machine owner mode.

Optionally, the performing the target control function according to the target information includes:

when the input time is outside the time range corresponding to the first animation duration, the input time is within the time range corresponding to the second animation duration, and the input position is located in the second display area, displaying a program interface of a preset application program.

It is assumed that the first animation duration is the duration corresponding to the first time period, the first time period is from 0 ms to 10 ms, and the second animation duration is the duration corresponding to the second time period, the second time period is from 1 ms to 15 ms, and the second input is input at the 11th ms. In this case, the input time of the second input is outside the time period corresponding to the first animation duration and within the time period corresponding to the second animation duration. If the input position is still in the second display area, the program interface of the preset application program is displayed, for example, a contact interface of an instant chat application is entered.

Herein, through the interaction between the user and the display effect of the wallpaper image, the purpose of quickly displaying the application information that the user wishes to see is achieved, and at the same time, the privacy and security of the machine owner mode can be effectively protected.

Optionally, the performing the target control function according to the target information includes:

triggering to execute a first object control function when the display area of the object layer image is larger than a first preset threshold and the input position is located in the first display area; and triggering to execute a second object control function when the display area of the object layer image is larger than a first preset threshold and the input position is located in the second display area;

where the first target control function and the second target control function are different control functions.

It should be noted that the difference between the first target control function and the second target control function may be that the two control functions correspond to different modes, or the two control functions themselves are different.

For example, the first target control function is to control the terminal display interface to be displayed in a first mode (daytime mode), and the second target control function is to control the terminal display interface to be displayed in a second mode (night mode). For another example, the first target control function is to display a contact interface of an instant chat application, and the second target control function is to display a shopping page of a shopping application.

Herein, combined with the display effect of the wallpaper image, a specific function is triggered by a specific gesture. For example, clicking the first display area and the second display area respectively can trigger different functions, so that the user can interact with the display effect of the target image, which further empowers the wallpaper image on the basis of appreciation, and at the same time, can effectively protect the privacy and security of the machine owner mode.

In the wallpaper display control method of the embodiments of the present application, the user can see the visual effect that the object layer image of the wallpaper image brightens first and then the background layer image brightens when the screen is lit, and the effect of the gradual diffusion combined with the shape outline displayed in a process of brightening the object layer image can bring a good visual experience to the user. This method can not only effectively highlight the user's wallpaper among the many information on the screen, but also enable different wallpapers set by the user to apply this effect. In addition, users can also activate specific functions through specific gestures in combination with display effects.

It should be noted that, in the wallpaper display control method provided by the embodiments of the present application, the execution body may be a wallpaper display control apparatus, or a control module in the wallpaper display control apparatus for executing the wallpaper display control method. In an embodiment of the application, the wallpaper display control apparatus provided in the embodiments of the application is described by using an example in which the wallpaper display control method is performed by a wallpaper display control apparatus.

Figure 4:
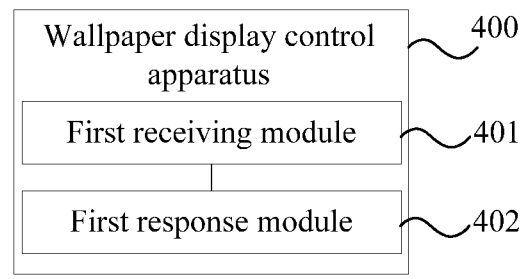
FIG. 4 is a schematic diagram of modules of a wallpaper display control apparatus according to an embodiment of the present invention.

As shown in FIG. 4, an embodiment of the present application also provides a wallpaper display control apparatus 400, including:

a first receiving module 401, configured to receive a first input performed by a user, where the first input is used to trigger lighting of the screen of an electronic device; and a first response module 402, configured to: in response to the first input, control an object layer image of a wallpaper image of the screen of the electronic device to execute a first display animation based on a first animation parameter, and control a background layer image of the wallpaper image to execute a second display animation based on a second animation parameter.

The first animation parameter and the second animation parameter are different.

Optionally, the wallpaper display control apparatus in the embodiments of the present application further includes:

a first obtaining module, configured to: before the first response module controls an object layer image of a wallpaper image of the screen of the electronic device to execute a first display animation based on a first animation parameter, and controls a background layer image of the wallpaper image to execute a second display animation based on a second animation parameter, separate an object layer from a background layer of the wallpaper image to obtain the object layer image and the background layer image, and in a process of separating the object layer from the background layer of the wallpaper image, record outline information and center point information of the object layer image.

Optionally, in the wallpaper display control apparatus of the embodiments of the present application, the first response module is configured to: according to the outline information and the center point information of the object layer image, control the object layer image of the wallpaper image of the screen of the electronic device to execute the first display animation in a preset manner;

where the preset manner includes at least one of the following:

a manner of spreading from the center point to the surrounding, and a manner of gathering from the surrounding to the center point.

Optionally, in the wallpaper display control apparatus of the embodiment of the present application, the first animation parameter changes from a first numerical value to a second numerical value within a first animation duration, and the second animation parameter changes from a third numerical value to a fourth numerical value within a second animation duration;

The first animation duration is less than the second animation duration, and the first numerical value is greater than or equal to the third numerical value.

The first animation parameter includes at least one of transparency and brightness.

The second animation parameter includes at least one of transparency and brightness.

The first animation duration is an animation duration corresponding to the object layer image, and the second animation duration is an animation duration corresponding to the background layer image.

Optionally, the wallpaper display control apparatus in the embodiments of the present application further includes:

a second receiving module, configured to receive a second input performed by the user on the screen;

a determining module, configured to determine an input parameter of the second input, where the input parameter includes at least one of an input time and an input location; and a processing module, configured to execute a target control function according to target information;

where the target information includes at least one of the following: a first relationship, a second relationship, and a real-time display area of the wallpaper image;

where the first relationship refers to a relationship between the input time and the first animation duration and the second animation duration, the second relationship refers to a relationship between the input position and a first display area and a second display area, the first display area is a display area corresponding to the object layer image, and the second display area is a display area corresponding to the background layer image;

The real-time display area of the wallpaper image is a real-time display area of the background layer image or a real-time display area of the object layer image.

Optionally, in the wallpaper display control apparatus of the embodiments of the present application, the processing module is configured to: when the input time is within a time range corresponding to the first animation duration, and the input position is within the first display area, display an unlock interface;

or when the input time is within the time range corresponding to the first animation duration, the input position is within the first display area, and the input track of the second input is a preset track, display the target information of a preset application program.

Optionally, in the wallpaper display control apparatus of the embodiments of the present application, the processing module is configured to: when the input time is outside the time range corresponding to the first animation duration, the input time is within the time range corresponding to the second animation duration, and the input position is located in the second display area, display a program interface of a preset application program.

Optionally, in the wallpaper display control apparatus of the embodiments of the present application, the processing module is configured to trigger to execute a first object control function when the display area of the object layer image is larger than a first preset threshold and the input position is located in the first display area; and trigger to execute a second object control function when the display area of the object layer image is larger than a first preset threshold and the input position is located in the second display area;

where the first target control function and the second target control function are different control functions.

In the wallpaper display control apparatus of the embodiments of the present application, the object layer image and the background layer image are displayed based on different animation parameters, which can effectively distinguish the object layer image from the background layer image in the wallpaper image, and then can highlight the object layer image in the wallpaper image. In addition, any image set as the wallpaper by the user can achieve the effect of highlighting the object layer image in the wallpaper image, thereby strengthening the function of the wallpaper in the process of using the mobile terminal by the user.

The wallpaper display control apparatus in this embodiment of the application may be an apparatus, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (UMPC), a netbook, or a personal digital assistant (PDA), and the non-mobile electronic device may be a server, a network attached storage (NAS), a personal computer (PC), a television (TV), a counter, or a self-service machine. This is not specifically limited in this embodiment of the present application.

The wallpaper display control apparatus in this embodiment of the present application may be an apparatus with an operating system. The operating system may be an Android (Android) operating system, may be an iOS operating system, or may be another possible operating system, which is not specifically limited in the embodiments of the present application.

The wallpaper display control apparatus provided in this embodiment of the present application can implement the processes in the foregoing method embodiments in FIG. 1, FIG. 2, FIG. 3a, and FIG. 3b. To avoid repetition, details are not described herein again.

Figure 5:
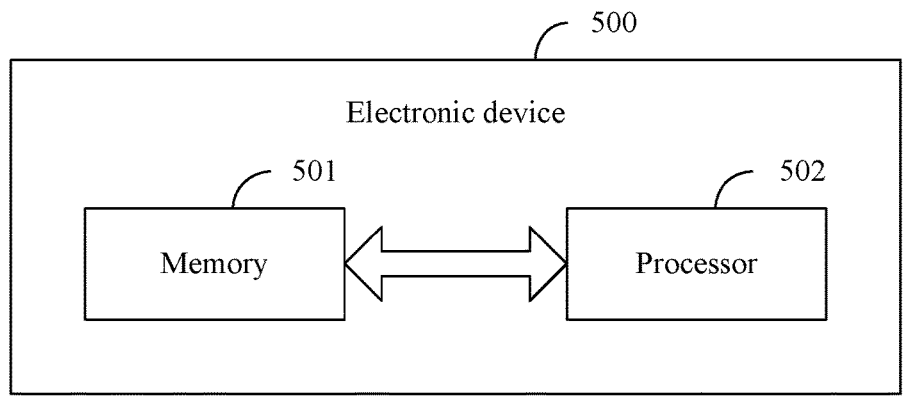
FIG. 5 is a first structural block diagram of an electronic device according to an embodiment of the present invention.

Optionally, as shown in FIG. 5, the embodiments of the present application further provide an electronic device 500, including a processor 501, a memory 502, and programs or instructions stored in the memory 502 and executable on the processor 501. When the programs or instructions are executed by the processor 501, the processes of the foregoing embodiment of the wallpaper display control method are implemented, and a same technical effect can be achieved. To avoid repetition, details are not described herein again.

It should be noted that the electronic device in this embodiment of the present application includes the foregoing mobile electronic device and the foregoing non-mobile electronic device.

Figure 6:
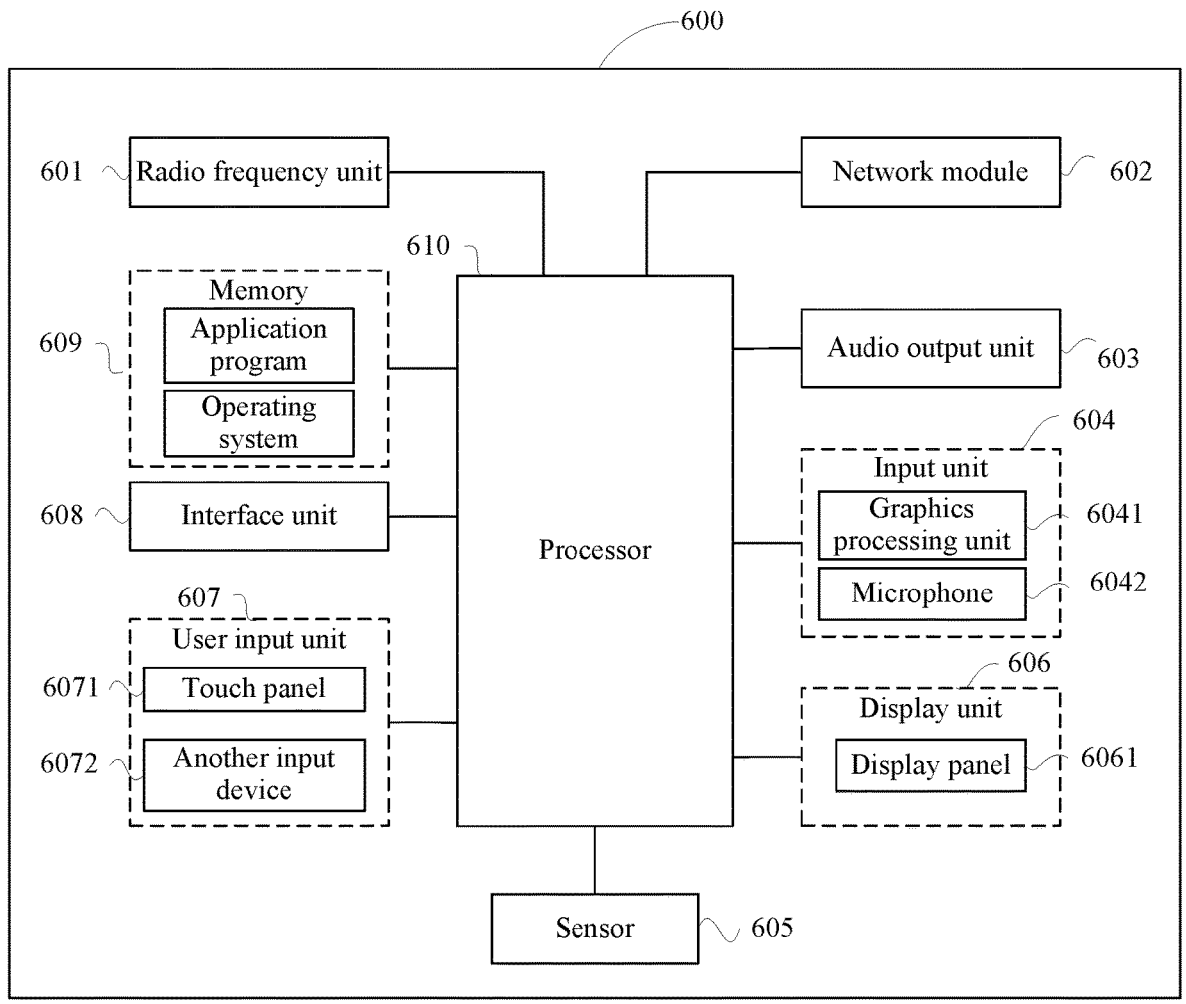
FIG. 6 is a second structural block diagram of an electronic device according to an embodiment of the present invention.

FIG. 6 is a schematic structural diagram of an electronic device according to an embodiment of the present application.

The electronic device 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

A person skilled in the art can understand that the electronic device 600 may further include a power supply (for example, a battery) that supplies power to the components. The power supply may be logically connected to the processor 610 by using a power management system, so as to implement functions such as charging management, discharging management, and power consumption management by using the power management system. The electronic device is not limited to the electronic device structure shown in FIG. 6. The electronic device may include more or fewer components than those shown in the figure, or combine some of the components, or arrange the components differently. Details are not described herein.

The user input unit 607 is configured to receive a first input performed by a user, where the first input is used to trigger lighting of the screen of an electronic device.

The processor 610 is configured to: in response to the first input, control an object layer image of a wallpaper image of the screen of the electronic device to execute a first display animation based on a first animation parameter, and control a background layer image of the wallpaper image to execute a second display animation based on a second animation parameter.

The first animation parameter and the second animation parameter are different.

In the electronic device of the embodiments of the present application, the object layer image and the background layer image are displayed based on different animation parameters, which can effectively distinguish the object layer image from the background layer image in the wallpaper image, and then can highlight the object layer image in the wallpaper image. In addition, any image set as the wallpaper by the user can achieve the effect of highlighting the object layer image in the wallpaper image, thereby strengthening the function of the wallpaper in the process of using the mobile terminal by the user.

Optionally, the processor 610 is further configured to separate an object layer from a background layer of the wallpaper image to obtain the object layer image and the background layer image, and in a process of separating the object layer from the background layer of the wallpaper image, record outline information and center point information of the object layer image.

Optionally, the processor 610 is further configured to: according to the outline information and the center point information of the object layer image, control the object layer image of the wallpaper image of the screen of the electronic device to execute the first display animation in a preset manner;
where the preset manner includes at least one of the following:
a manner of spreading from the center point to the surrounding, and a manner of gathering from the surrounding to the center point.

Optionally, the first animation parameter changes from a first numerical value to a second numerical value within a first animation duration, and the second animation parameter changes from a third numerical value to a fourth numerical value within a second animation duration;

The first animation duration is less than the second animation duration, and the first numerical value is greater than or equal to the third numerical value.

The first animation parameter includes at least one of transparency and brightness.

The second animation parameter includes at least one of transparency and brightness.

The first animation duration is an animation duration corresponding to the object layer image, and the second animation duration is an animation duration corresponding to the background layer image.

Optionally, the user input unit 607 is further configured to receive a second input performed by the user on the screen;
and the processor 610 is further configured to determine an input parameter of the second input, where the input parameter includes at least one of an input time and an input position;
execute a target control function according to target information;
where the target information includes at least one of the following: a first relationship, a second relationship, and a real-time display area of the wallpaper image;
where the first relationship refers to a relationship between the input time and the first animation duration and the second animation duration, the second relationship refers to a relationship between the input position and a first display area and a second display area, the first display area is a display area corresponding to the object layer image, and the second display area is a display area corresponding to the background layer image;

The real-time display area of the wallpaper image is a real-time display area of the background layer image or a real-time display area of the object layer image.

Optionally, the processor 610 is further configured to: when the input time is within a time range corresponding to the first animation duration, and the input position is within the first display area, displaying an unlock interface;
or when the input time is within the time range corresponding to the first animation duration, the input position is within the first display area, and the input track of the second input is a preset track, display the target information of a preset application program.

Optionally, the processor 610 is further configured to: when the input time is outside the time range corresponding to the first animation duration, the input time is within the time range corresponding to the second animation duration, and the input position is located in the second display area, display a program interface of a preset application program.

Optionally, the processor 610 is further configured to trigger to execute a first object control function when the display area of the object layer image is larger than a first preset threshold and the input position is located in the first display area; and
trigger to execute a second object control function when the display area of the object layer image is larger than a first preset threshold and the input position is located in the second display area;
where the first target control function and the second target control function are different control functions.

In the electronic device of the embodiments of the present application, the object layer image and the background layer image are displayed based on different animation parameters, which can effectively distinguish the object layer image from the background layer image in the wallpaper image, and then can highlight the object layer image in the wallpaper image. In addition, any image set as the wallpaper by the user can achieve the effect of highlighting the object layer image in the wallpaper image, thereby strengthening the function of the wallpaper in the process of using the mobile terminal by the user.

It should be understood that, in the embodiments of the present application, the input unit 604 may include a graphics processing unit (Graphics Processing Unit, GPU) 6041 and a microphone 6042, and the graphics processing unit 6041 processes image data of a still picture or video obtained by an image capture apparatus (such as a camera) in a video capture mode or an image capture mode. The display unit 606 may include a display panel 6061, and the display panel 6061 may be configured in a form of a liquid crystal display, an organic light-emitting diode, or the like. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein. The memory 609 may be configured to store a software program and various data, including but not limited to an application program and an operating system. The processor 610 may be integrated with an application processor and a modem processor. The application processor mainly processes an operating system, a user interface, an application program, and the like, and the modem processor mainly processes wireless communication. It can be understood that, alternatively, the modem processor may not be integrated into the processor 610.

An embodiment of the present application further provides a readable storage medium. The readable storage medium stores a program or an instruction. When the program or instruction is executed by a processor, the processes of the foregoing wallpaper display control embodiment are implemented, and a same technical effect can be achieved. To avoid repetition, details are not described herein again.

The processor is a processor in the electronic device in the foregoing embodiment. The readable storage medium includes a computer-readable storage medium such as a computer read-only memory (ROM), a random access memory (RAM), a magnetic disk, or an optical disc.

An embodiment of the present application further provides a chip, where the chip includes a processor and a communication interface, the communication interface is coupled to the processor, and the processor is configured to run a program or an instruction to implement the foregoing processes of the foregoing embodiment of the wallpaper display control method, and a same technical effect can be achieved. To avoid repetition, details are not described herein again.

It should be understood that the chip mentioned in this embodiment of the present application may also be referred to as a system-level chip, a system chip, a chip system, or an on-chip system chip.

It can be understood that the embodiments described in the present disclosure may be implemented by hardware, software, firmware, middleware, microcode, or a combination thereof. For implementation with hardware, a module, unit, submodule, subunit, and the like may be implemented in one or more application specific integrated circuits (ASIC), a digital signal processor (DSP), a digital signal processor device (DSPD), a programmable logic device (PLD), a field-programmable gate array (FPGA), a general-purpose processor, a controller, a microcontroller, a microprocessor, another electronic unit for implementing the functions of the present application, or a combination thereof.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the method and the apparatus in the embodiments of the present application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such understanding, the technical solutions of the present application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of the present application.

The embodiments of the present application are described above with reference to the accompanying drawings, but the present application is not limited to the foregoing specific implementation manners. The foregoing specific implementation manners are merely schematic instead of restrictive. Under enlightenment of the present application, a person of ordinary skills in the art may make many forms without departing from aims and the protection scope of claims of the present application, all of which fall within the protection scope of the present application.

What is claimed is:

1. A wallpaper display control method, comprising:
   receiving a first input performed by a user, wherein the first input is used to trigger lighting of the screen of an electronic device; and
   in response to the first input, separating an object layer from a background layer of the wallpaper image to obtain the object layer image and the background layer image, and in a process of separating the object layer from the background layer of the wallpaper image, recording outline information and center point information of the object layer image;
   controlling an object layer image of a wallpaper image of the screen of the electronic device to execute a first display animation based on a first animation parameter, and controlling a background layer image of the wallpaper image to execute a second display animation based on a second animation parameter, wherein the first animation parameter and the second animation parameter are different.

2. The wallpaper display control method according to claim 1, wherein the controlling an object layer image of a wallpaper image of the screen of the electronic device to execute a first display animation based on a first animation parameter comprises:

according to the outline information and the center point information of the object layer image, controlling the object layer image of the wallpaper image of the screen of the electronic device to execute the first display animation in a preset manner;

wherein the preset manner comprises at least one of the following:

a manner of spreading from the center point to the surrounding, and a manner of gathering from the surrounding to the center point.

3. The wallpaper display control method according to claim 1, wherein the first animation parameter changes from a first numerical value to a second numerical value within a first animation duration, and the second animation parameter changes from a third numerical value to a fourth numerical value within a second animation duration;

the first animation duration is less than the second animation duration, and the first numerical value is greater than or equal to the third numerical value;

the first animation parameter comprises at least one of transparency and brightness;

the second animation parameter comprises at least one of transparency and brightness; and the first animation duration is an animation duration corresponding to the object layer image, and the second animation duration is an animation duration corresponding to the background layer image.

4. The wallpaper display control method according to claim 3, further comprising:

receiving a second input performed by the user on the screen;

determining an input parameter of the second input, wherein the input parameter comprises at least one of an input time and an input location; and executing a target control function according to target information;

wherein the target information comprises at least one of the following: a first relationship, a second relationship, and a real-time display area of the wallpaper image;

wherein the first relationship refers to a relationship between the input time and the first animation duration and the second animation duration, the second relationship refers to a relationship between the input position and a first display area and a second display area, the first display area is a display area corresponding to the object layer image, and the second display area is a display area corresponding to the background layer image; and the real-time display area of the wallpaper image is a real-time display area of the background layer image or a real-time display area of the object layer image.

5. The wallpaper display control method according to claim 4, wherein the executing a target control function according to the target information comprises:

when the input time is within a time range corresponding to the first animation duration, and the input position is within the first display area, displaying an unlock interface;

or when the input time is within the time range corresponding to the first animation duration, the input position is within the first display area, and the input track of the second input is a preset track, displaying the target information of a preset application program.

6. The wallpaper display control method according to claim 4, wherein the executing a target control function according to the target information comprises:

when the input time is outside the time range corresponding to the first animation duration, the input time is within the time range corresponding to the second animation duration, and the input position is located in the second display area, displaying a program interface of a preset application program.

7. The wallpaper display control method according to claim 4, wherein the executing a target control function according to the target information comprises:

triggering to execute a first object control function when the display area of the object layer image is larger than a first preset threshold and the input position is located in the first display area; and triggering to execute a second object control function when the display area of the object layer image is larger than a first preset threshold and the input position is located in the second display area;

wherein the first target control function and the second target control function are different control functions.

8. An electronic device, comprising:

a processor; and a memory storing programs or instructions that are executable on the processor, wherein the programs or instructions, when executed by the processor, cause the electronic device to perform the following steps:

receiving a first input performed by a user, wherein the first input is used to trigger lighting of the screen of an electronic device; and in response to the first input, separating an object layer from a background layer of the wallpaper image to obtain the object layer image and the background layer image, and in a process of separating the object layer from the background layer of the wallpaper image, recording outline information and center point information of the object layer image;

controlling an object layer image of a wallpaper image of the screen of the electronic device to execute a first display animation based on a first animation parameter, and controlling a background layer image of the wallpaper image to execute a second display animation based on a second animation parameter, wherein the first animation parameter and the second animation parameter are different.

9. The electronic device according to claim 8, wherein in the process of controlling an object layer image of a wallpaper image of the screen of the electronic device to execute a first display animation based on a first animation parameter, the programs or instructions, when executed by the processor, cause the electronic device to further perform the following steps:

according to the outline information and the center point information of the object layer image, controlling the object layer image of the wallpaper image of the screen of the electronic device to execute the first display animation in a preset manner;

wherein the preset manner comprises at least one of the following:
a manner of spreading from the center point to the surrounding, and a manner of gathering from the surrounding to the center point.

10. The electronic device according to claim 8, wherein the first animation parameter changes from a first numerical value to a second numerical value within a first animation duration, and the second animation parameter changes from a third numerical value to a fourth numerical value within a second animation duration;
the first animation duration is less than the second animation duration, and the first numerical value is greater than or equal to the third numerical value;
the first animation parameter comprises at least one of transparency and brightness;
the second animation parameter comprises at least one of transparency and brightness; and
the first animation duration is an animation duration corresponding to the object layer image, and the second animation duration is an animation duration corresponding to the background layer image.

11. The electronic device according to claim 10, wherein the programs or instructions, when executed by the processor, cause the electronic device to further perform the following steps:
receiving a second input performed by the user on the screen;
determining an input parameter of the second input, wherein the input parameter comprises at least one of an input time and an input location; and
executing a target control function according to target information;
wherein the target information comprises at least one of the following: a first relationship, a second relationship, and a real-time display area of the wallpaper image;
wherein the first relationship refers to a relationship between the input time and the first animation duration and the second animation duration, the second relationship refers to a relationship between the input position and a first display area and a second display area, the first display area is a display area corresponding to the object layer image, and the second display area is a display area corresponding to the background layer image; and
the real-time display area of the wallpaper image is a real-time display area of the background layer image or a real-time display area of the object layer image.

12. The electronic device according to claim 11, wherein in the process of executing a target control function according to the target information, the programs or instructions, when executed by the processor, cause the electronic device to further perform the following steps:
when the input time is within a time range corresponding to the first animation duration, and the input position is within the first display area, displaying an unlock interface;
or when the input time is within the time range corresponding to the first animation duration, the input position is within the first display area, and the input track of the second input is a preset track, displaying the target information of a preset application program.

13. The electronic device according to claim 11, wherein in the process of executing a target control function according to the target information, the programs or instructions, when executed by the processor, cause the electronic device to further perform the following steps:
when the input time is outside the time range corresponding to the first animation duration, the input time is within the time range corresponding to the second animation duration, and the input position is located in the second display area, displaying a program interface of a preset application program.

14. The electronic device according to claim 11, wherein in the process of executing a target control function according to the target information, the programs or instructions, when executed by the processor, cause the electronic device to further perform the following steps:
triggering to execute a first object control function when the display area of the object layer image is larger than a first preset threshold and the input position is located in the first display area; and
triggering to execute a second object control function when the display area of the object layer image is larger than a first preset threshold and the input position is located in the second display area;
wherein the first target control function and the second target control function are different control functions.

15. A non-transitory readable storage medium storing programs or instructions, wherein the programs or instructions, when executed by a processor, cause the processor to perform the following steps:
receiving a first input performed by a user, wherein the first input is used to trigger lighting of the screen of an electronic device; and
in response to the first input, separating an object layer from a background layer of the wallpaper image to obtain the object layer image and the background layer image, and in a process of separating the object layer from the background layer of the wallpaper image, recording outline information and center point information of the object layer image;
controlling an object layer image of a wallpaper image of the screen of the electronic device to execute a first display animation based on a first animation parameter, and controlling a background layer image of the wallpaper image to execute a second display animation based on a second animation parameter;
wherein the first animation parameter and the second animation parameter are different.

16. The non-transitory readable storage medium according to claim 15, wherein in the process of controlling an object layer image of a wallpaper image of the screen of the electronic device to execute a first display animation based on a first animation parameter, the programs or instructions, when executed by a processor, cause the processor to further perform the following steps:
according to the outline information and the center point information of the object layer image, controlling the object layer image of the wallpaper image of the screen of the electronic device to execute the first display animation in a preset manner;
wherein the preset manner comprises at least one of the following:
a manner of spreading from the center point to the surrounding, and a manner of gathering from the surrounding to the center point.

17. The non-transitory readable storage medium according to claim 15, wherein the first animation parameter changes from a first numerical value to a second numerical value within a first animation duration, and the second animation parameter changes from a third numerical value to a fourth numerical value within a second animation duration;

the first animation duration is less than the second animation duration, and the first numerical value is greater than or equal to the third numerical value;

the first animation parameter comprises at least one of transparency and brightness;

the second animation parameter comprises at least one of transparency and brightness; and the first animation duration is an animation duration corresponding to the object layer image, and the second animation duration is an animation duration corresponding to the background layer image.

\* \* \* \* \*